United States Patent
Racca (10) Patent No.: US 10,465,635 B2
(45) Date of Patent: Nov. 5, 2019

(54) SYSTEMS AND METHODS WITH IMPROVED LR-EGR ACTIVATION

(71) Applicant: GM GLOBAL TECHNOLOGY OPERATIONS LLC, Detroit, MI (US)

(72) Inventor: Alberto Racca, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 15/465,358

(22) Filed: Mar. 21, 2017

(65) Prior Publication Data

US 2018/0274496 A1 Sep. 27, 2018

(51) Int. Cl.

| | |
|---|---|
| *F02M 26/26* | (2016.01) |
| *F02B 37/18* | (2006.01) |
| *F02M 26/04* | (2016.01) |
| *F02M 26/30* | (2016.01) |
| *F02B 47/08* | (2006.01) |

(52) U.S. Cl.
CPC ............ *F02M 26/26* (2016.02); *F02B 37/18* (2013.01); *F02M 26/04* (2016.02); *F02M 26/30* (2016.02); *F02B 47/08* (2013.01)

(58) Field of Classification Search
CPC ........ F02M 26/26; F02M 26/04; F02M 26/30; F02B 37/18; F02B 47/08; Y02T 10/144
See application file for complete search history.

(56) References Cited

U.S. PATENT DOCUMENTS

| | | | |
|---|---|---|---|
| 10,125,702 B2* | 11/2018 | Racca | F02D 41/0065 |
| 2006/0137665 A1* | 6/2006 | Khair | F02M 26/05 |
| | | | 123/568.12 |
| 2014/0208738 A1* | 7/2014 | Park | F02G 5/02 |
| | | | 60/599 |
| 2018/0258870 A1* | 9/2018 | Racca | F02D 41/0065 |

* cited by examiner

*Primary Examiner* — Sizo B Vilakazi
(74) *Attorney, Agent, or Firm* — Lorenz & Kopf, LLP (57) ABSTRACT

Exhaust gas recirculation systems and methods are provided for an internal combustion engine. The system includes a first conduit configured to receive at least a portion of exhaust gas from the internal combustion engine; a cooling circuit selectively fluidly coupled to the first conduit; a bypass circuit selectively fluidly coupled to the first conduit and including a bypass conduit; and a second conduit fluidly coupled to receive the exhaust gas flowing through the cooling circuit and through the bypass circuit. A cooling valve has a bypass position to direct the exhaust gas from the first conduit through the bypass circuit, a cooling position to direct the exhaust gas from the first conduit through the cooling circuit, and a closed position to prevent the exhaust gas from flowing into either of the bypass or cooling circuits. The system further includes a heating device for selectively heating the bypass conduit.

18 Claims, 5 Drawing Sheets

SYSTEMS AND METHODS WITH IMPROVED LR-EGR ACTIVATION

TECHNICAL FIELD

The present disclosure generally relates to an internal combustion engine, typically an internal combustion engine of a motor vehicle, and more particularly relates to exhaust gas recirculation systems for internal combustion engines.

BACKGROUND

Internal combustion engines may burn a mixture of air and fuel within one or more combustion chambers and produce exhaust gas. Some automotive systems may include an exhaust gas recirculation system configured for recirculating a portion of the exhaust gas back into the internal combustion engine, thereby providing the possibility of reduced emissions.

Accordingly, it is desirable to provide improved exhaust gas recirculation systems, including systems that may be activated to operate under a broader range of conditions. Furthermore, other desirable features and characteristics of the present invention will become apparent from the subsequent detailed description and the appended claims, taken in conjunction with the accompanying drawings and the foregoing technical field and background.

SUMMARY

An exhaust gas recirculation system is provided for an internal combustion engine. The system includes a first conduit configured to receive at least a portion of exhaust gas from the internal combustion engine; a cooling circuit selectively fluidly coupled to the first conduit; a bypass circuit selectively fluidly coupled to the first conduit and including a bypass conduit; and a control valve coupled to the first conduit, the cooling circuit, and the bypass conduit. The cooling valve has at least a bypass position to direct the exhaust gas from the first conduit through the bypass circuit, a cooling position to direct the exhaust gas from the first conduit through the cooling circuit, and a closed position to prevent the exhaust gas from flowing into either of the bypass circuit or the cooling circuit. The system further includes a heating device coupled to the bypass conduit for selectively heating the bypass conduit and a second conduit fluidly coupled to receive the exhaust gas flowing through the cooling circuit and through the bypass circuit. The second conduit is fluidly coupled to direct the exhaust gas back to the internal combustion engine.

A method is provided for operating an exhaust gas recirculation system for an internal combustion engine. The exhaust gas recirculation system includes a bypass circuit and a cooling circuit. The method includes determining a bypass conduit wall temperature associated with a bypass conduit of the bypass circuit; comparing a bypass conduit wall temperature to a dew point temperature; heating, when the bypass conduit wall temperature is less than the dew point temperature, a wall of the bypass conduit with a heating device; and positioning, when the bypass conduit wall temperature meets or exceeds the dew point temperature, a control valve into a bypass position such that exhaust gas is recirculated through the bypass circuit.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
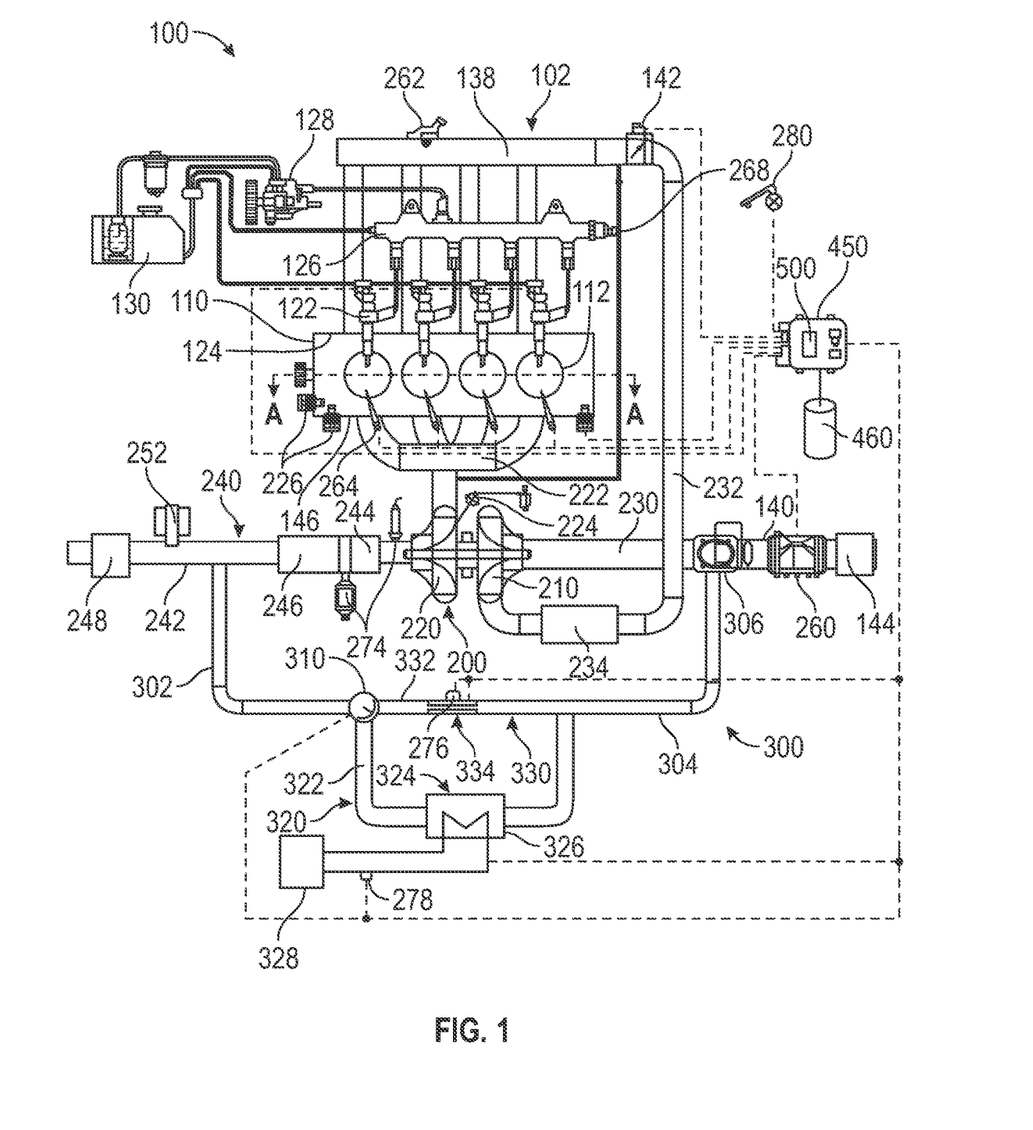
FIG. 1 is a schematic view of an automotive system according to an exemplary embodiment.
Figure 2:
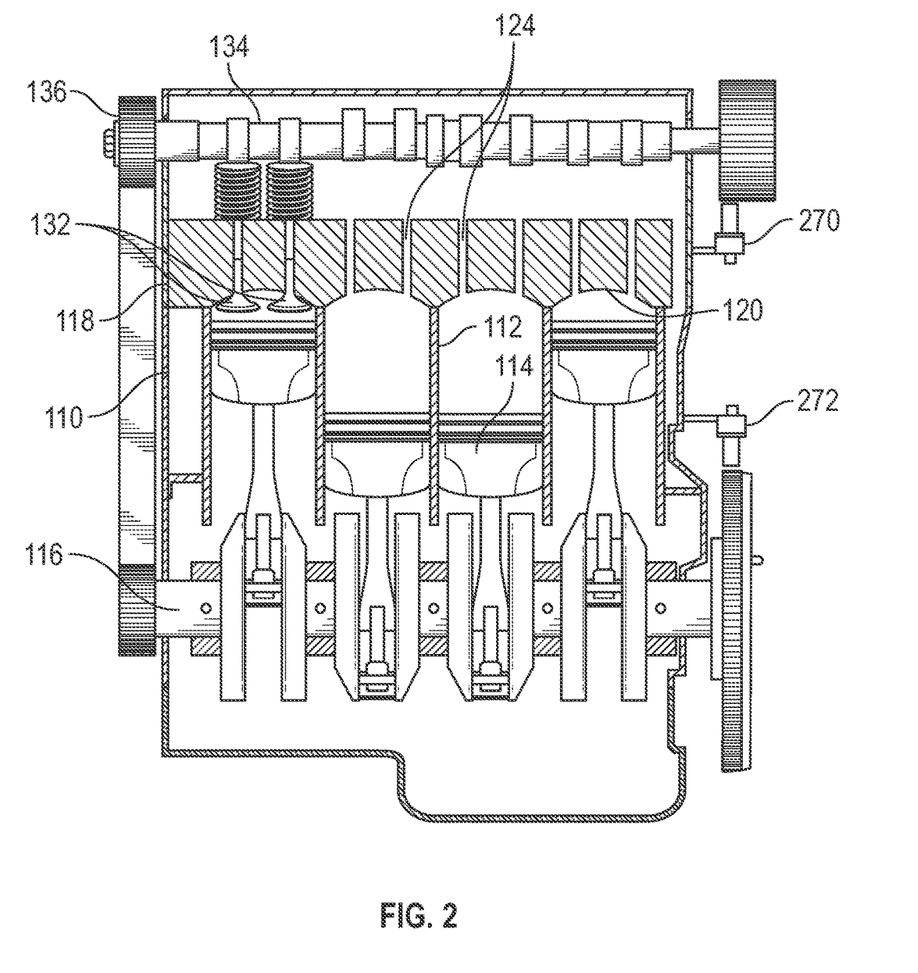
FIG. 2 is the section A-A of an internal combustion engine belonging to the automotive system of FIG. 1.

Some embodiments may include an automotive system 100, as shown in FIGS. 1 and 2 that includes an internal combustion engine 102. It is appreciated that the engine 102 and various aspects of the overall system 100 are merely exemplary in nature and that embodiments described herein may be implemented in various engine systems.

In the depicted embodiment, the engine 102 includes an engine block 110 defining at least one cylinder 112 having a piston 114 coupled to rotate a crankshaft 116. A cylinder head 118 cooperates with the piston 114 to define a combustion chamber 120. A fuel and air mixture (not shown) is disposed in the combustion chamber 120 and ignited, thereby resulting in hot expanding exhaust gas forcing reciprocal movement of the piston 114. The air is provided through at least one intake port 124, and the fuel is provided via at least one fuel injector 122 from a fuel rail 126 in fluid communication with a high pressure fuel pump 128 and a fuel source 130. Each of the cylinders 112 has at least two valves 132 actuated by a camshaft 134 rotating in time with the crankshaft 116. The valves 132 selectively allow air into the combustion chamber 120 from the port 124. In some examples, a cam phaser 136 may selectively vary the timing between the camshaft 134 and the crankshaft 116.

The air may be distributed to the air intake ports 124 through an intake manifold 138. An air intake duct 140 may provide air from the ambient environment to the intake manifold 138. In one embodiment, the air intake duct 140 may include a filter 144 for filtering incoming air, and further, a throttle body 142 may be provided to regulate the flow of air into the intake manifold 138. After combustion, the exhaust gas flows out of exhaust ports 146 through an exhaust manifold 222.

In some embodiments, a turbocharger 200 or other type of forced air system may be provided to facilitate or improve emissions and/or efficiency. The turbocharger 200 may include a compressor 210 rotationally coupled to a turbine 220. For example, air may flow from the intake duct 140 to a turbocharger intake conduit 230 and into the compressor 210. The compressor 210 increases the pressure and temperature of the air and subsequently directs the air through a turbocharger outlet duct 232 to the intake manifold 138. An intercooler 234 may be disposed in the turbocharger outlet duct 232 to reduce the temperature of the air prior to entering the intake manifold 138. The turbine 220 is coupled to the exhaust manifold 222 of the engine 102 and rotates by receiving exhaust gas from the exhaust manifold 222. The example of FIG. 1 depicts a variable geometry turbine (VGT) with a VGT actuator 224 arranged to move the vanes to alter the flow of the exhaust gas through the turbine 220. In other embodiments, the turbocharger 200 may be fixed geometry and/or include a waste gate. Upon exiting the turbine 220, the exhaust gas is directed into an aftertreatment system 240.

The aftertreatment system 240 may include an exhaust pipe 242 having one or more exhaust aftertreatment devices configured to change the composition of the exhaust gas. Some examples of aftertreatment devices of the aftertreatment system 240 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF). By way of example, the after-treatment devices of the aftertreatment system 240 may include a diesel oxidation catalyst (DOC) 244 for degrading residual hydrocarbons (HC) and carbon oxides (CO) contained in the exhaust gas and a diesel particulate filter (DPF) 246 for capturing and removing diesel particulate matter from the exhaust gas. The after-treatment devices of the aftertreatment system 240 may further include selective catalytic reduction (SCR) system components, such as a SCR catalyst 248 disposed in the exhaust pipe downstream of the DPF 246, and a diesel-exhaust-fluid (DEF) injector 252 disposed the exhaust pipe 242 between the DPF 246 and the SCR catalyst 248. The DEF injector 252 is provided for injecting DEF into the exhaust pipe 242 that mixes with the exhaust gas and is converted thereby into a gaseous reducing agent.

One or more exhaust gas recirculation (EGR) systems 300, 390 may be provided to reduce nitrogen oxide (NOx) emissions in the automotive system 100 by recirculating exhaust gas back into the engine 102. Generally, the EGR systems 300, 390 include a "long-route" (LR) (or low pressure) EGR system 300 and a "short-route" (SR) EGR system 390, although the SR-EGR system 390 may be omitted in some embodiments. The EGR systems 300, 390 will be introduced below prior to a more detailed description of operation.

The LR-EGR system 300 recirculates a portion of the exhaust gas back into the turbocharger 200 and thus back into the engine 102. In this embodiment, the LR-EGR system 300 may include an LR-EGR upstream conduit 302 that fluidly extends from the exhaust pipe 242. More specifically, the LR-EGR upstream conduit 302 branches from a portion of the exhaust pipe 242 located downstream of the turbine 220. In the depicted example, the upstream conduit 302 branches from the exhaust pipe 242 at a position downstream of the DPF 246 and upstream of the DEF injector 252.

A downstream conduit 304 of the LR-EGR system 300 is fluidly coupled to the intake conduit 230 to direct the exhaust gas from the LR-EGR system 300 back into the compressor 210 of the turbocharger 200. In this example, the LR-EGR downstream conduit 304 is joined at a portion of the intake conduit 230 located between the air filter 144 and the compressor 210. An intake valve 306, which may be located at the junction between the LR-EGR downstream conduit 304 and the intake conduit 230, may facilitate regulation of the flow of ambient air in the intake conduit 230 and/or exhaust gas in the LR-EGR system 300.

The upstream conduit 302 and the downstream conduit 304 of the LR-EGR system 300 are fluidly coupled together via a cooling circuit 320 or a bypass circuit 330. In other words, during operation of the LR-EGR system 300, the exhaust gas flows from the exhaust pipe 242 through the upstream conduit 302, selectively through the cooling circuit 320 or bypass circuit 330, and through the downstream conduit 304 to the intake conduit 230. An EGR control valve 310 is provided to regulate flow through the cooling circuit 320 and bypass circuit 330, as well as into the upstream conduit 302. As described in greater detail below, the EGR control valve 310 may have three positions or modes. In a first (or closed) position, the EGR control valve 310 prevents exhaust gas from flowing through the LR-EGR system 300. In a second (or normal) position, the exhaust gas flows through a cooling circuit 320, but not through the bypass circuit 330. In a third (or bypass) position, the exhaust gas flows through a bypass circuit 330, but not through the cooling circuit 320.

Generally, the cooling circuit 320 includes a cooling conduit 322 extending between the upstream conduit 302 and the downstream conduit 304. The cooling circuit 320 further includes a cooling assembly 324 that functions to cool the exhaust gas flowing through the cooling conduit 322 prior to being directed back into the turbocharger 200 and engine 102. For example, the cooling assembly 324 includes a heat exchanger 326 with coolant (e.g., water, antifreeze, or a mixture thereof) flowing therethrough that removes heat from the exhaust gas. The coolant flowing through the heat exchanger 326 may be cooled by a cooling device 328 in fluid communication with the heat exchanger 326. In one exemplary embodiment, the cooling device 328 and heat exchanger 326 may be part of a larger cooling system, e.g., a cooling system that services other portions of the automotive system 100 and/or vehicle. As an example, the cooling device 328 may be a further heat exchanger such as a radiator that exchanges the heat removed from the exhaust gas with the air of the ambient environment. Further, although not shown, additional components such as vanes and pumps may be provided.

Generally, the bypass circuit 330 includes a bypass conduit 332 extending between the upstream conduit 302 and the downstream conduit 304. The bypass circuit 330 further includes a heating device 334 that functions to raise the temperature of the walls of the bypass conduit 332. Additional details regarding the heating device 334 will be provided below.

Figure 3:
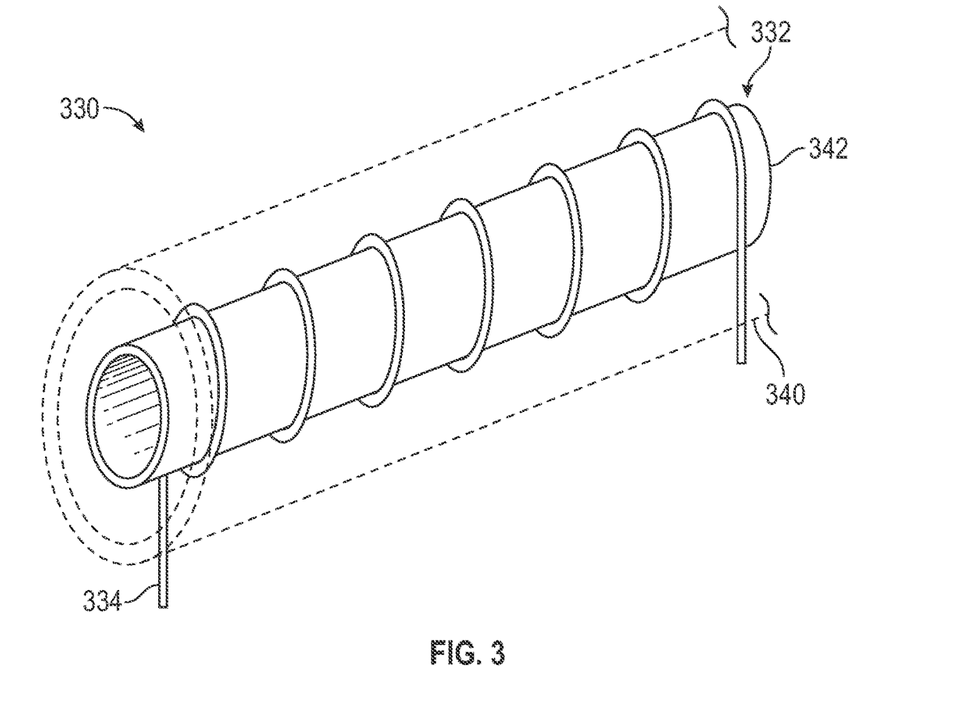
FIG. 3 is an isometric view of a portion of a bypass conduit of an EGR system of the automotive system of FIG. 1 in accordance with an exemplary embodiment.

Reference is briefly made to FIG. 3, which is a partial isometric view of a portion of the bypass circuit 330 in accordance with an exemplary embodiment. The portion shown in FIG. 3 particularly includes the heating device 334 in the form of a heating element embedded in, or otherwise in contact with, the wall of the bypass conduit 332. As one example, the heating device 334 is an elongated element that is spiraled around the wall of the bypass conduit 332. Upon activation, the heating device 334 applies heat to raise the temperature of wall of the bypass conduit 332. In one embodiment, the heating element may be a resistive element (e.g., implementing Joule heating), although other heating arrangements may be provided.

In some embodiments, the bypass conduit 332 may be embodied as a double-walled conduit with a further, outer wall 340 (shown with dashed lines) surrounding an inner wall 342 that forms a flow path for the exhaust gas, such that an air gap is formed between the outer and inner walls 340, 342. In this embodiment, the heating device 334 may be provided on the inner wall 342 to, upon activation, raise the temperature of the wall in contact with the exhaust gas. In one embodiment, the inner wall 342 may be relatively thin to enable quicker heating, and the outer wall 340 may be relatively thick, for example, to fulfill any structural requirements or function. As such, in one embodiment, the outer wall 340 may be thicker than the inner wall 342.

Figure 4:
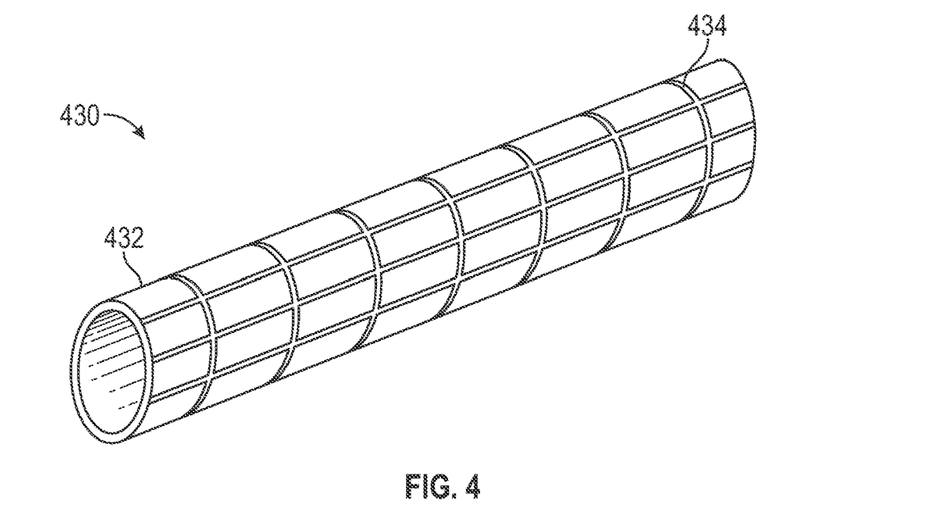
FIG. 4 is an isometric view of a portion of a bypass conduit of an EGR system of an automotive system in accordance with another exemplary embodiment.

Reference is briefly made to FIG. 4, which is a partial isometric view of a portion of a bypass circuit 430 that may be an alternative to the arrangement depicted in FIG. 3. As above, a bypass conduit 432 (e.g., similar to bypass conduit 332 of FIG. 3) is configured to for a flow path for the exhaust gas. In this embodiment, a heating device 434 is arranged on the conduit 432 in a grid pattern to heat the wall of the conduit 432. Although not shown, the conduit 432 may have a double-walled construction, such as described above, with the depicted bypass conduit 432 forming an inner wall circumscribed by an additional outer wall. As such, the bypass circuit 330 of FIG. 1 may be implemented with the arrangements of FIG. 3 or FIG. 4, although in further embodiments, other heating arrangements and conduits may be provided.

Returning to FIG. 1 and as noted above, the LR-EGR system 300 may operate to recirculate exhaust gas from the exhaust pipe 242 back into the engine 102. Under normal conditions, the EGR control valve 310 directs air through the cooling circuit 320 in order to cool the relatively hot exhaust gas prior to entering the turbocharger 200 and/or engine 102. However, in certain conditions, this operation of the LR-EGR system 300 may not be ideal or desirable. For example, in cold ambient temperatures, the walls of the cooling conduit 322 and/or bypass conduit 332 may be cold, and are generally much colder than the temperature of the exhaust gas. Similarly, the coolant circulating through the cooling circuit 320 may be cold. A combination of cold wall or coolant temperatures and humid exhaust gas may result in the formation of liquid condensation, and condensation may result in a number of undesirable issues, particularly with respect to the durability of compressor 210 of the turbocharger 200.

In conventional LR-EGR systems, the controller may delay activation of the LR-EGR until coolant temperature rises to a dew point temperature. However, in the exemplary embodiments described herein, operation of the LR-EGR system 300 may be advantageously modified in order to provide operation of the LR-EGR system 300 across a broader range of conditions, while avoiding or mitigating issues such as condensation. Additional details about the operation of the EGR control valve 310, cooling assembly 324, and heating device 334 are provided below.

The SR-EGR system 390 includes a conduit 392 to direct exhaust gas from the exhaust manifold 222 to the intake manifold 138, although other coupling positions may be provided. Although not shown, various valves, coolers, sensors, and the like may be provided for operating the SR-EGR system 390.

The automotive system 100 may further include an electronic control unit (ECU) 450 in communication with one or more sensors and/or devices associated with the engine 102 and other automotive system components. In FIG. 1, dashed lines are used to indicate communication between the ECU 450 and the various sensors and devices, but some are omitted for clarity. Generally, the ECU 450 may receive input signals from various sensors configured to generate the signals in proportion to various physical parameters associated with the engine 102. The sensors include, but are not limited to, a mass airflow and temperature sensor 260, a manifold pressure and temperature sensor 262, a combustion pressure sensor 264, coolant and oil temperature and level sensors 266, a fuel rail pressure sensor 268, a cam position sensor 270, a crank position sensor 272, exhaust pressure sensors 274, an EGR bypass temperature sensor 276, an EGR coolant temperature sensor 278, and an accelerator pedal position sensor 280. Furthermore, the ECU 450 may generate output signals to various control devices that are arranged to control the operation of the engine 102, including, but not limited to, the fuel injectors 122, the throttle body 142, the intake valve 306, the VGT actuator 224, and the cam phaser 136. Additional output signals may be generated by the ECU 450, particularly additional output signals associated with the LR-EGR system 300. In one embodiment, an EGR control unit 500 may be implemented by the ECU 450 to control operation of the LR-EGR system 300, as will be described in greater detail below. In this context, the ECU 450, and/or more specifically the EGR control unit 500, may generate output signals associated with the EGR control valve 310, the heating device 334, and/or cooling assembly 324.

Generally, the ECU 450 may include a digital processing unit in communication with a memory system, such as data source 460, and an interface bus. The processing unit is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the processing unit to carry out the steps of such methods and control the automotive system 100.

The program stored in the memory system may be transmitted from outside via a cable or in a wireless fashion. In some instances, the program may be embodied as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature. An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop. In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like. The ECU 450 may be embodied in any suitable form to provide the electronic logic, e.g. an embedded controller, an onboard computer, or any processing module that might be deployed in the vehicle.

As introduced above, an EGR control unit 500 may be implemented by the ECU 450 to control operation of the LR-EGR system 300. As such, the EGR control unit 500 may be considered part of the EGR systems 300, 390, particularly the LR-EGR system 300.

Figure 5:
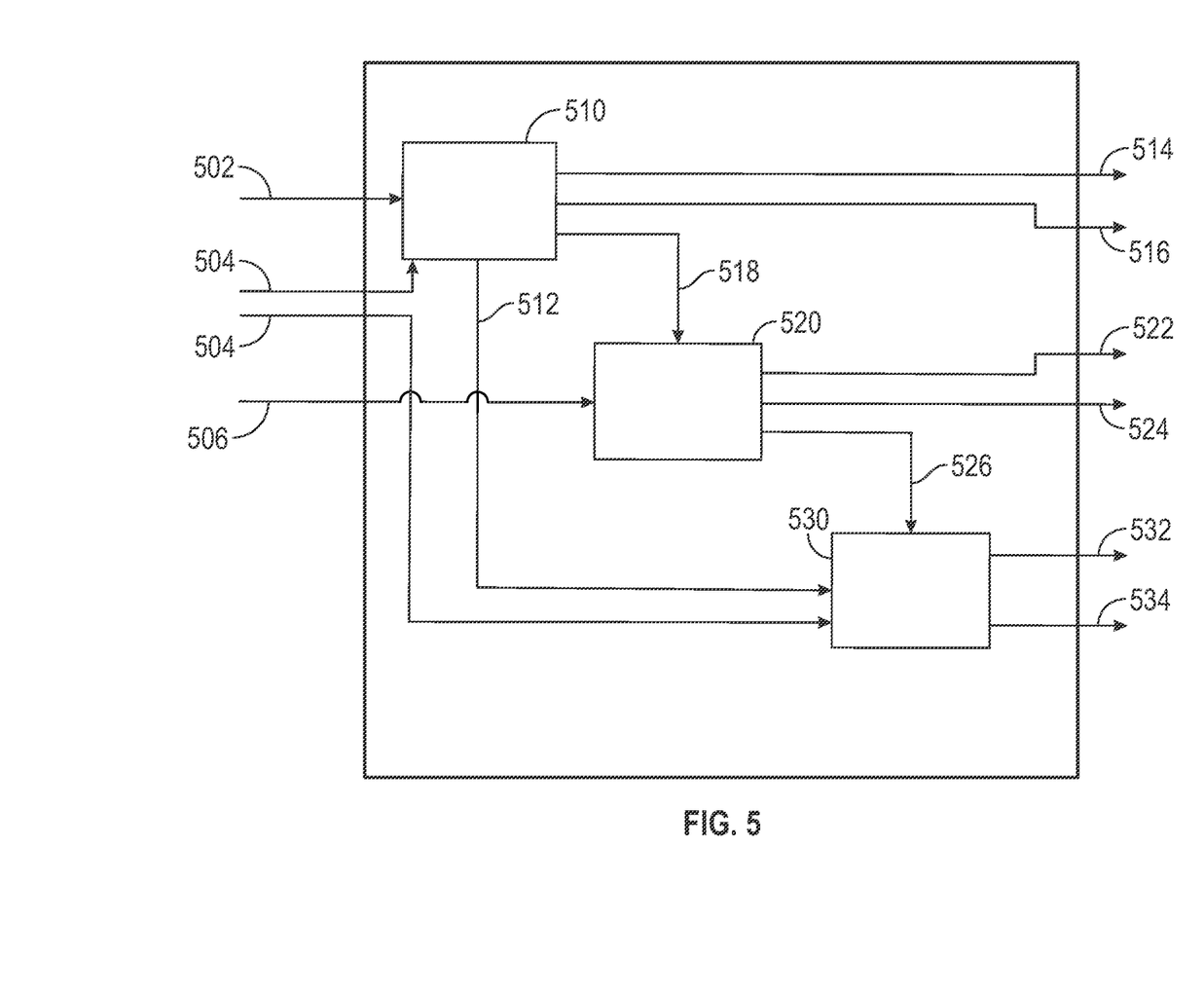
FIG. 5 is schematic block diagram of an EGR control unit of the automotive system of FIG. 1 according to an exemplary embodiment.

FIG. 5 is a functional block diagram of the EGR control unit 500 with dataflows that illustrate various operational aspects of the LR-EGR system 300. The EGR control unit 500 may be considered to implement one or more functional sub-units or modules, including an initiation module 510, a bypass module 520, and a cooling module 530. As can be appreciated, the modules 510, 520, 530 shown in FIG. 5 may be combined and/or further partitioned to similarly operate according to the functions described herein. FIG. 5 will be described below with additional reference to FIG. 1.

Generally, the operational check module 510 functions to control the start-up or the initiation of operation of the LR-EGR system 300, which may be initiated in any suitable condition, particularly the situations described below. In one embodiment, the operational check module 510 may initiate operation based on input data 502, and in addition, the operational check module 510 may also receive a signal 504 representing the coolant temperature ($T_{COOL}$) associated with the cooling device 328 of the cooling circuit 320. In response, the operational check module 510 may compare the coolant temperature ($T_{COOL}$) to a temperature threshold ($T_0$).

In one exemplary embodiment, the temperature threshold ($T_0$) is a dew point temperature ($T_{dp}$) within the LR-EGR system 300. In one embodiment, the dew point temperature ($T_{dp}$) may be calculated based on any suitable parameters, such as temperature and pressure, as examples. As such, the temperature threshold ($T_0$) may be stored and/or calculated by a respective module (e.g., module 510, discussed above, or module 520, discussed below).

When the coolant temperature ($T_{COOL}$) meets or exceeds the temperature threshold ($T_0$), the operational check module 510 may generate a normal mode signal 512 that is provided to the cooling module 530, discussed in greater detail below.

Otherwise, when the coolant temperature ($T_{COOL}$) is less than the temperature threshold ($T_0$), the operational check module 510 may generate an EGR-closed valve signal 514 and a bypass heating-on signal 516. The EGR-closed valve signal 514 and bypass heating-on signal 516 may be output by the EGR control unit 500 (e.g., the ECU 450) to the associated component to carry out the desired function. In this example, the EGR-closed valve signal 514 is provided to the EGR control valve 310 to place or maintain the EGR valve in the closed position. Since the exhaust gas is not being recirculated through LR-EGR circuit, the LR-EGR system 300 will not be subjected to condensation issues. The bypass heating-on signal 516 is provided to the EGR bypass heating device 334 such that the heating device 334 is activated and commences warming a portion of the bypass conduit 332.

When the coolant temperature ($T_{COOL}$) is less than the temperature threshold ($T_0$), the operational check module 510 further generates a wall monitoring signal 518 for the bypass module 520. Upon receiving the wall monitoring signal 518, the bypass module 520 begins receiving and/or evaluating the wall temperature ($T_{WALL}$) and the temperature threshold ($T_0$). As noted above, the wall temperature ($T_{WALL}$) may be collected by the bypass temperature sensor 276 and generally corresponds to the temperature of the walls of the bypass conduit 332 in which the exhaust gas will come into contact. In some embodiments, the wall temperature ($T_{WALL}$) may be estimated based on, for example, ambient temperature and/or the elapsed time since activation of the heating device 334.

As such, the bypass module 520 evaluates the wall temperature ($T_{WALL}$) in view of the temperature threshold ($T_0$). Typically, in cold weather, the dew point temperature is initially higher than the wall temperature of the bypass conduit 332. In these conditions, the bypass module 520 will take no action and the EGR control valve 310 will remain closed. However, as the heating device 334 operates (e.g., resulting from bypass heating-on signal 516 generated by the operational check module 510) to warm the bypass conduit 332, the wall temperature ($T_{WALL}$) will increase. The bypass module 520 continues to monitor the wall temperature ($T_{WALL}$), and when the wall temperature exceeds the temperature threshold ($T_0$), the bypass module 520 generates a bypass-open valve signal 522, a bypass heating-off signal 524, and a coolant monitoring signal 526. The bypass-open valve signal 522 is provided to actuate the EGR control valve 310 into the second or bypass position. As a result of this valve position, the LR-EGR system 300 operates to recirculate the exhaust gas back into the engine 102 via the bypass circuit 330. The bypass heating-off signal 524 is provided to deactivate the heating device 334. Generally, at this point, the wall temperature of the bypass conduit 332 is such that condensation does not occur. Moreover, at this point, even without the heat provided by the heating device 334, the walls of the bypass conduit 332 will maintain a temperature higher than the dew point temperature due to the temperatures of the exhaust gas.

In effect, operation of the bypass module 520 enables activation and use of the LR-EGR system 300 with the bypass circuit 330 in a manner that is independent of coolant temperature.

The cooling module 530 receives the coolant monitoring signal 526. Upon receipt, the cooling module 530 may further receive signals 504 associated with the coolant temperature ($T_{COOL}$) and compare the coolant temperature ($T_{COOL}$) to the temperature threshold ($T_0$). When the coolant temperature ($T_{COOL}$) meets or exceeds the temperature threshold ($T_0$), the cooling module 530 generates a cooling-open valve signal 532. The cooling-open valve signal 532 is provided to actuate the EGR control valve 310 into the cooling position. As a result of this valve position, the bypass conduit 332 is closed and the exhaust gas flows through cooling conduit 322 such that the LR-EGR system 300 operates to recirculate the cooled exhaust gas back into the engine 102. During further operation, the EGR control module 500 may monitor conditions (e.g., the coolant temperature ($T_{COOL}$) and/or the wall temperature ($T_{WALL}$) to modify operation of the LR-EGR system 300, including operation as described above.

As noted above, the cooling module 530 may also receive the normal mode signal 512 from the operational check module 510. In one embodiment, the temperature threshold ($T_0$) of the operational check module 510 may be the same as the coolant temperature ($T_{COOL}$) of the cooling module 530 such that, in effect, the cooling module 530 may immediately generate the cooling-open valve signal 532 and the operational signals 534.

Figure 6:
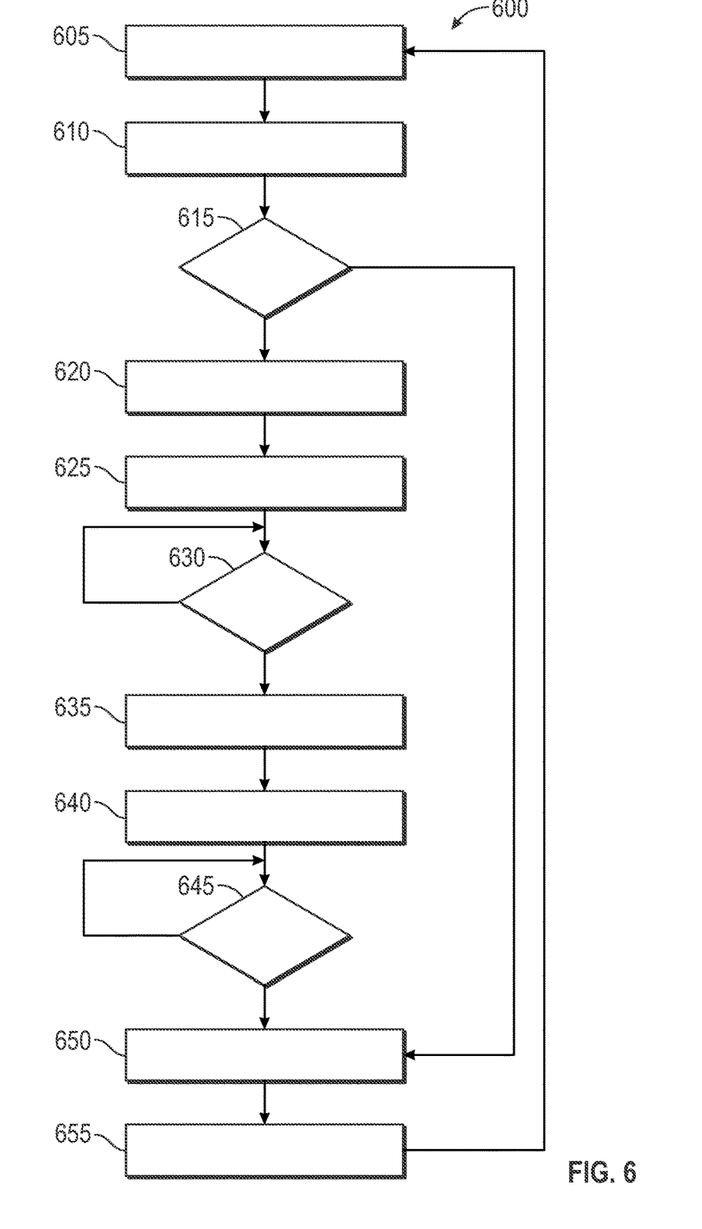
FIG. 6 is a flowchart of a method for operating an EGR system according to an exemplary embodiment.

FIG. 6 is a flowchart of a method 600 for operating an EGR system according to an exemplary embodiment. The method 600 of FIG. 6 may be implemented within, as an example, the automotive system 100 of FIG. 1 by the EGR control unit 500 of FIG. 5. As such, FIGS. 1 and 5 are referenced in the discussion of the method 600 below.

The various tasks performed in connection with the method 600 may be performed by software, hardware, firmware, or any combination thereof. For illustrative purposes, the following description of the method 600 may refer to elements mentioned above in connection with FIGS. 1-5. It should be appreciated that the method 600 may include any number of additional or alternative tasks, the tasks shown in FIG. 6 need not be performed in the illustrated order, and the method 600 may be incorporated into a more comprehensive procedure or process having additional functionality not described in detail herein. Moreover, one or more of the tasks shown in FIG. 6 could be omitted from an embodiment of the method 600 as long as the intended overall functionality remains intact.

In a first step 605, the EGR control unit 500 initiates operation. In step 605, the EGR control valve is typically in the closed position and the LR-EGR system 300 is not recirculating exhaust gas back to the engine 102.

In step 610, the EGR control unit 500 begins receiving and/or determining one or more parameters or signals, including a coolant temperature ($T_{COOL}$), a wall temperature ($T_{WALL}$) for the bypass conduit 332, and other input data that may be used to calculate and/or determine the parameters described below.

In step 615, the EGR control unit 500 compares the coolant temperature ($T_{COOL}$) to a temperature threshold ($T_0$), which as discussed above, corresponds to the dew point temperature ($T_{dp}$) in exemplary embodiments. If the coolant temperature ($T_{COOL}$) meets or exceeds the temperature threshold ($T_0$), the method 600 proceeds to step 650, which is discussed in greater detail below. If the coolant temperature ($T_{COOL}$) is less than the temperature threshold ($T_0$), the method 600 proceeds to step 620. In some embodiments, step 615 may be omitted.

In step 620, the EGR control unit 500 generates an EGR valve closed signal in order to close the EGR control valve 310. In this position, the EGR control valve 310 prevents exhaust gas from being recirculated by the LR-EGR system 300.

In step 625, the EGR control unit 500 generates a signal to activate the bypass heating device 334. As a result, the heating device 334 begins warming the wall of the bypass conduit 332.

In step 630, the EGR control unit 500 evaluates the wall temperature ($T_{WALL}$) for the bypass conduit 332 in view of the temperature threshold ($T_0$). If the wall temperature ($T_{WALL}$) is less than the temperature threshold ($T_0$), the EGR control unit 500 continues to monitor until such conditions change. When the wall temperature ($T_{WALL}$) meets or exceeds the temperature threshold ($T_0$), the method 600 proceeds to step 635. In some embodiments, steps 610, 615, 620, 625, and 630 may be considered an initiation mode of operation for the LR-EGR system 300.

In step 635, the EGR control unit 500 generates a signal to place the EGR control valve 310 in the bypass position. In this position, the LR-EGR system 300 recirculates exhaust gas through the bypass circuit 330, and the cooling circuit 320 remains closed. In step 640, the EGR control unit 500 may further generate a signal to deactivate the heating device 334.

In step 645, the EGR control unit 500 again evaluates the coolant temperature ($T_{COOL}$) in view of the temperature threshold ($T_0$). If the coolant temperature is less than the predetermined temperature, the control unit 500 continues to monitor coolant temperature ($T_{COOL}$) in view of the temperature threshold ($T_0$) until conditions change. When the coolant temperature ($T_{COOL}$) meets or exceeds the temperature threshold ($T_0$), the method 600 proceeds to step 650. In some embodiments, steps 635, 640, and 645 may be considered a bypass mode of operation for the LR-EGR system 300.

In step 650, the EGR control unit 500 generates a signal to place the EGR control valve 310 into the cooling position. In this position, the LR-EGR system 300 recirculates exhaust gas through the cooling circuit 320, and the bypass circuit 330 remains closed. In step 655, the EGR control unit 500 may generate further operational signals to operate the LR-EGR system 300 in a normal mode. In some embodiments, steps 650 and 655 may be considered a normal mode of operation for the LR-EGR system 300. The method 600 may return to step 605 in which the EGR control unit 500 continues to monitor conditions in view of the coolant temperature ($T_{COOL}$) and/or wall temperature ($T_{WALL}$) and modifies operation of the LR-EGR system 300, as necessary.

Accordingly, exemplary embodiments may provide for operation of the LR-EGR systems over a broader range of conditions. In particular, exemplary embodiment may enable operation of the LR-EGR systems during relatively cold conditions while avoiding or mitigating condensation issues.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Example embodiments are provided so that this disclosure will be thorough, and will convey the scope to those who are skilled in the art. Details may be set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An exhaust gas recirculation system for an internal combustion engine, comprising:
    a first conduit configured to receive at least a portion of exhaust gas from the internal combustion engine;
    a cooling circuit selectively fluidly coupled to the first conduit;
    a bypass circuit selectively fluidly coupled to the first conduit and comprising a bypass conduit having a wall configured to define a flow path through the bypass conduit;
    a control valve coupled to the first conduit, the cooling circuit, and the bypass conduit, the control valve having at least a bypass position to direct the exhaust gas from the first conduit through the bypass circuit, a cooling position to direct the exhaust gas from the first conduit through the cooling circuit, and a closed position to prevent the exhaust gas from flowing into either of the bypass circuit or the cooling circuit;
    a heating device coupled to the wall of the bypass conduit for selectively heating the wall of the bypass conduit;
    a second conduit downstream of the cooling circuit and the bypass circuit, and fluidly coupled to receive the exhaust gas flowing through the cooling circuit and through the bypass circuit, the second conduit fluidly coupled to direct the exhaust gas back to the internal combustion engine; and
    a control unit, having a processor, coupled to the control valve and to the heating device, the control unit configured to:
    determine a bypass conduit wall temperature of the wall of the bypass conduit;
    compare the bypass conduit wall temperature to a dew point temperature;
    activate the heating device to heat the wall of the bypass conduit based on the comparison of the bypass conduit wall temperature to the dew point temperature; and
    command the control valve to the bypass position to direct the exhaust gas from the first conduit through the bypass circuit based on the bypass conduit wall temperature as greater than the dew point temperature.

2. The exhaust gas recirculation system of claim 1, wherein the control unit is configured to determine a coolant temperature associated with coolant in the cooling circuit and to selectively command the control valve based on the coolant temperature.

3. The exhaust gas recirculation system of claim 2, wherein the control unit is further configured to determine the dew point temperature associated with an ambient environment.

4. The exhaust gas recirculation system of claim 3, wherein the control unit is configured to command the control valve to be in the closed position when the bypass conduit wall temperature is less than the dew point temperature.

5. The exhaust gas recirculation system of claim 4, wherein the control unit is configured to activate the heating device when the bypass conduit wall temperature is less than the dew point temperature.

6. The exhaust gas recirculation system of claim 1, wherein the control unit is configured to deactivate the heating device when the bypass conduit wall temperature exceeds the dew point temperature.

7. The exhaust gas recirculation system of claim 3, wherein the control unit is configured to command the control valve to be in the cooling position when the coolant temperature exceeds the dew point temperature.

8. The exhaust gas recirculation system of claim 1, wherein the heating device comprises a resistive heating element.

9. The exhaust gas recirculation system of claim 8, wherein the resistive heating element is spiraled around the bypass conduit.

10. The exhaust gas recirculation system of claim 8, wherein the resistive heating element is arranged in a grid pattern on the bypass conduit.

11. A method of operating an exhaust gas recirculation system for an internal combustion engine, the exhaust gas recirculation system including a bypass circuit and a cooling circuit, the method comprising:
    determining, by a processor, a bypass conduit wall temperature associated with a wall of a bypass conduit of the bypass circuit;
    comparing, by the processor, a bypass conduit wall temperature to a dew point temperature;
    based on the bypass conduit wall temperature as less than the dew point temperature, activating a heating device, by the processor, to heat the wall of the bypass conduit; and
    commanding, by the processor, a control valve into a bypass position such that exhaust gas is recirculated through the bypass circuit based on the bypass conduit wall temperature meeting or exceeding the dew point temperature.

12. The method of claim 11, further comprising deactivating the heating device, by the processor, based on the bypass conduit wall temperature meeting or exceeding the dew point temperature.

13. The method of claim 11, further comprising closing, by the processor, the control valve based on the bypass conduit wall temperature as less than the dew point temperature.

14. The method of claim 11, further comprising:
    determining, by the processor, a coolant temperature associated with coolant in the cooling circuit;
    comparing, by the processor, the coolant temperature to the dew point temperature; and
    positioning, by the processor, the control valve into a cooling position such that the exhaust gas is recirculated through the cooling circuit based on the coolant temperature meeting or exceeding the dew point temperature.

15. The method of claim 14, wherein the positioning the control valve into the cooling position includes preventing the exhaust gas from being recirculated through the bypass circuit.

16. The method of claim 14, further comprising maintaining, la the processor, the control valve in the bypass position based on the coolant temperature as less than the dew point temperature.

17. The method of claim 11, wherein the activating the heating device, by the processor, to heat the wall of the bypass conduit further comprises activating, by the processor, a resistive heating element spiraled around the bypass conduit to heat the wall of the bypass conduit.

18. The method of claim 11, wherein the activating the heating device, by the processor, to heat the wall of the bypass conduit further comprises activating, by the processor, resistive heating element arranged in a grid pattern on the bypass conduit to heat the wall of the bypass conduit.

* * * * *